US010414279B2

(12) United States Patent
Kautz et al.

(10) Patent No.: US 10,414,279 B2
(45) Date of Patent: *Sep. 17, 2019

(54) INDUCTIVE WIRELESS POWER TRANSFER SYSTEMS

(71) Applicant: FORD GLOBAL TECHNOLOGIES, LLC, Dearborn, MI (US)

(72) Inventors: Richard William Kautz, North Branch, MI (US); Nevin Altunyurt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 367 days.

This patent is subject to a terminal disclaimer.

(21) Appl. No.: 14/577,457

(22) Filed: Dec. 19, 2014

(65) Prior Publication Data

US 2016/0181820 A1 Jun. 23, 2016

(51) Int. Cl.
| | |
|---|---|
| *H02J 5/00* | (2016.01) |
| *B60L 11/18* | (2006.01) |
| *H02J 7/02* | (2016.01) |
| *H02J 50/10* | (2016.01) |
| *H01F 27/36* | (2006.01) |
| *H01F 38/14* | (2006.01) |
| *B60L 53/12* | (2019.01) |
| *H02J 7/00* | (2006.01) |

(52) U.S. Cl.
CPC ............ *B60L 11/182* (2013.01); *B60L 53/12* (2019.02); *H01F 27/365* (2013.01); *H01F 38/14* (2013.01); *H02J 7/025* (2013.01); *H02J 50/10* (2016.02); *H01F 27/367* (2013.01); *H02J 7/0027* (2013.01); *Y02T 10/7005* (2013.01); *Y02T 10/7072* (2013.01); *Y02T 90/122* (2013.01); *Y02T 90/14* (2013.01)

(58) Field of Classification Search
CPC .... B60L 11/1811; B60L 11/182; H01F 38/14; H02J 5/005
See application file for complete search history.

(56) References Cited

U.S. PATENT DOCUMENTS

| | | |
|---|---|---|
| 7,880,337 B2 | 2/2011 | Farkas |
| 8,400,104 B2 | 3/2013 | Adamczyk et al. |

(Continued)

FOREIGN PATENT DOCUMENTS

WO    2014011059 A1    1/2014

OTHER PUBLICATIONS

G. Covic, et al., Possibilities in Inductive Energy Transfer, (2013) 50 pp., Power Electronics Research Department of Electrical & Computer Engineering, The University of Auckland, New Zealand.

(Continued)

*Primary Examiner* — Patrick Assouad
*Assistant Examiner* — Haidong Zhang
(74) *Attorney, Agent, or Firm* — David B. Kelley; Brooks Kushman P.C.

(57) ABSTRACT

A wireless power transfer system has a coil assembly including a ferrite pad and a pair of spaced apart inductive coils on the ferrite pad, and a switching network that, in response to an indication of a corresponding inductive coil assembly configuration, controls a direction of current flow through each of the coils to selectively operate the coils in a two-pole mode or a three-pole mode.

11 Claims, 10 Drawing Sheets

(56) References Cited

U.S. PATENT DOCUMENTS

| | | | |
|---|---|---|---|
| 8,418,823 B2 | 4/2013 | Matsumura | |
| 8,508,184 B2 | 8/2013 | Sakakibara et al. | |
| 2008/0265684 A1* | 10/2008 | Farkas | B60L 11/005 307/104 |
| 2011/0204845 A1 | 8/2011 | Paparo | |
| 2012/0095617 A1* | 4/2012 | Martin | B60L 11/1833 701/1 |
| 2012/0169139 A1* | 7/2012 | Kudo | H02J 17/00 307/104 |
| 2013/0038281 A1* | 2/2013 | Sakakibara | B60L 5/005 320/108 |
| 2013/0249477 A1 | 9/2013 | Keeling et al. | |
| 2013/0285463 A1* | 10/2013 | Covic | H01F 27/346 307/104 |
| 2015/0372498 A1* | 12/2015 | Ichikawa | B60L 11/1803 307/104 |

OTHER PUBLICATIONS

<http://www.electronics-tutorials.ws/inductor/mutual-inductance.html> 3 pp., printed on Oct. 11, 2013.
G. Covic et al., Inductive Power Transfer (IPT) Powering Our Future, Power Electronics Research Group Department of Electrical and Computer Engineering, (2010) 126 pp., The University of Auckland, New Zealand.

* cited by examiner

INDUCTIVE WIRELESS POWER TRANSFER SYSTEMS

TECHNICAL FIELD

Described herein are wireless power transfer systems.

BACKGROUND

Inductive wireless power transfer (WPT) utilizes magnetic coupling between two magnetic field coupling units (a primary coil and a secondary coil). WPT systems may be used to charge electric vehicles (EV), as well as mobile devices, medical devices, etc. In some examples, the secondary, or receiving coil, may employ a solenoidal winding topology. In other examples, the secondary coil may employ a circular winding topology.

SUMMARY

A wireless power transfer system includes a coil assembly having a ferrite pad and a pair of spaced apart inductive coils on the ferrite pad. The system also includes a switching network that, in response to an indication of a corresponding inductive coil assembly configuration, controls a direction of current flow through each of the coils to selectively operate the coils in a two-pole mode or a three-pole mode.

A wireless power transfer method includes, in response to an indication that a secondary coil assembly has a two-pole configuration, controlling current flow in each of a pair of primary coils that are spaced apart and wrapped around a ferrite pad such that directions of the current flow in the primary coils are the same, and in response to an indication that the secondary coil assembly has a three-pole configuration, controlling current flow in each of the primary coils such that directions of the current flow in the primary coils are opposite.

A wireless power transfer system has an inductive coil assembly including a ferrite pad and no more than two spaced apart inductive coils on the ferrite pad, and a switching network that controls a direction of current flow through each of the coils such that the coils generate a magnetic flux distribution having three poles.

DETAILED DESCRIPTION

Figure 1:
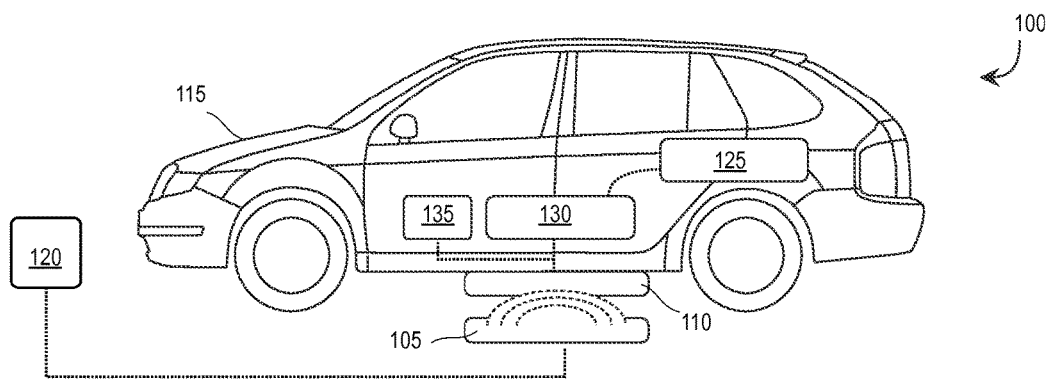
FIG. 1 is schematic view of a wireless power transfer system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

WPT for electric vehicles may be implemented in public charging stations. These charging stations may be installed in parking lots, public garages, etc., to enable frequent charging of electric cars to improve their driving range and usability. Main components of the magnetic field coupling units in WPT systems are single or multiple windings of current carrying wire, ferrite blocks, a non-magnetic highly conductive shielding metal plate, and plastic packaging. The winding and core topology design along with current excitation determine the magnetic field distribution generated by the coupling unit. Current wireless power transfer systems may be composed of couplers with the same winding topologies but with different size to accommodate packaging restrictions into the vehicle. In some examples, the coils may employ a winding topology that creates a pair of poles distributed on opposite sides of the coupler (linear two-pole flux distribution). An example for this type of two-pole topology is a solenoidal winding topology. In other examples, the coils may create one central pole and one distributed pole around the coupler periphery (circular two-pole flux distribution) such as a circular winding topology or frame coupler. Since the pole locations of these coil topologies are different, a vehicle with a circular receiving coil cannot effectively charge over a coil that generates a linear two-pole flux distribution. Disclosed herein are winding topologies that can generate both linear two-pole and linear three-pole flux distributions. The two-pole flux generating operation of the proposed coil may support solenoidal coils (and also other similar coil topologies), whereas the three-pole flux generating operation of the proposed coil can support circular coils (and other three-pole flux distribution generating coils). The proposed coils can be used either as a primary or a secondary coil.

In the automotive field, different automotive manufacturers may implement different systems within their vehicles. For example, some systems may implement a circular secondary coil which uses a centered pole for wireless power transfer. Others may implement a solenoidal secondary coil having no pole on the vehicle axis of symmetry. Such differences in the secondary coil assembly may make interoperability of the charging stations difficult, and/or require an offset condition between the vehicle and primary pad, which may be problematic for parking.

Described herein are wireless power transfer systems that may allow a charging station to effectively and efficiently wirelessly charge a vehicle having either a two-pole or three-pole configuration. These wireless power transfer systems may be configured to wirelessly transmit power from a primary coil assembly to a secondary coil assembly. The coil assembly may include two coils defining a center space there between. The center space may be optimized for efficient power transfer when the secondary coil assembly is either a two pole configuration or a three pole configuration.

FIG. 1 is an exemplary wireless power transfer system 100 showing a primary coil assembly 105 and a secondary coil assembly 110 within a vehicle 115. The primary coil assembly 105 may be connected to an external power source 120. The vehicle 115 may include a rechargeable battery 125 and a charge controller 135 in communication therewith. The charge controller 135 may be connected to a rectifier 130. The rectifier 130 may convert the alternating current (AC) of the secondary coil assembly 110 to direct current (DC). The rectifier 130 may then transmit the electrical current from the secondary coil assembly 110 to the battery 125 in order to charge the battery 125. The primary and secondary coil assemblies 105, 110 are described in more detail below. Each may include at least one coil. The coils of the primary coil assembly 105 may be coupled to secondary coils of the secondary coil assembly 110. As current flows through the primary coils, the energy emitted from the primary coils may be received at the secondary coils, which is in turn used to charge the battery.

Figure 2:
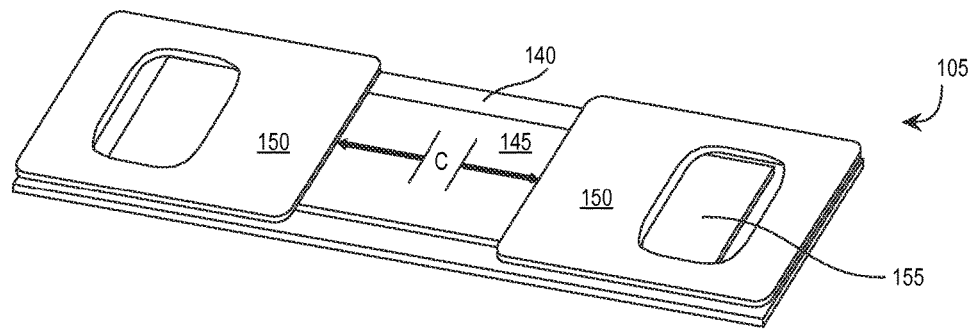
FIGS. 2, 3, 5, 9, 11 and 16 are schematic perspective views of primary coil assemblies.

FIG. 2 is an exemplary primary coil assembly 105. The primary coil assembly 105 may include a backing plate 140, a ferrite pad 145 and spiral windings 150. The backing plate 140 may be constructed of aluminum or some other non-magnetic highly conductive material to create a shield for the magnetic field and to aid in directing the magnetic field towards the opposite coil. The ferrite pad 145 may include a plurality of ferrite pads. The ferrite pad 145 along with a backing plate 140 may help guide the magnetic flux to enhance coupling by directing the magnetic field towards the secondary coil assembly 110.

The spiral coils 150 may include a copper winding coil arranged on top of the ferrite pad 145. The coils 150 may form a continuous ring-like shape defining a coil opening 155 in the center of each. The coils 150 may form a circular shape, or may have straight sides forming a quadrilateral shape, as shown in FIG. 2. The coils 150, 170 may be comprised of copper wire, typically Litz wire. As current is supplied to the coils 150, 170, a magnetic field may be created between the primary coil assembly 105 and the secondary coil assembly 110.

Figure 3:
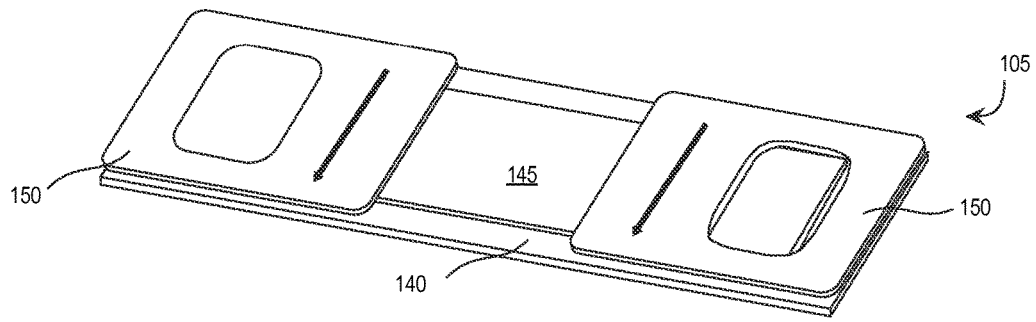

FIG. 3 shows an exemplary current flow through the coils 150. In this example, current is flowing in opposite directions in the coils 150 (clockwise in one, counter-clockwise in the other). As current is flowing through the coils 150 at the primary coil assembly 105, energy may be transmitted to the secondary coil assembly 110 via a magnetic field. If the secondary coil assembly 110 supports a two-pole configuration, then current may likewise flow in opposite directions in coils of the secondary coil assembly 110.

Figure 4:
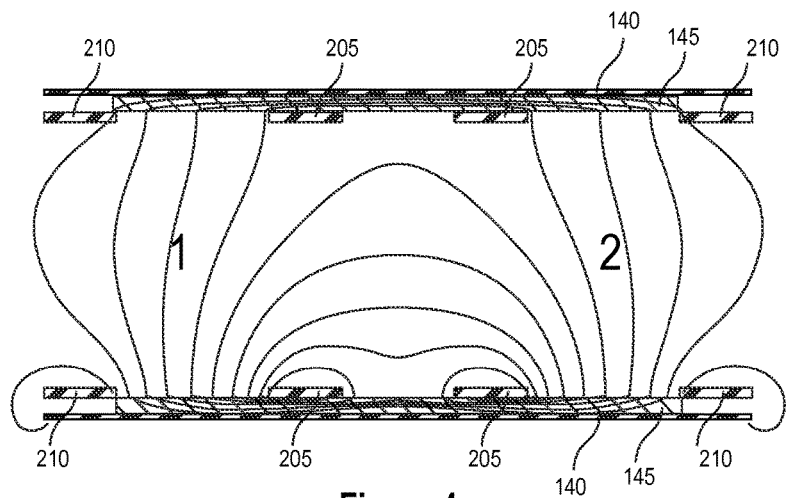
FIGS. 4 and 6 are side views, in cross-section, of primary and secondary coil assemblies for two-pole and three-pole configurations respectively.

FIG. 4 shows the corresponding flux distribution for a two-pole configuration when current is flowing in opposite directions as described above. As shown, a two-pole flux distribution is achieved in this example.

Figure 5:
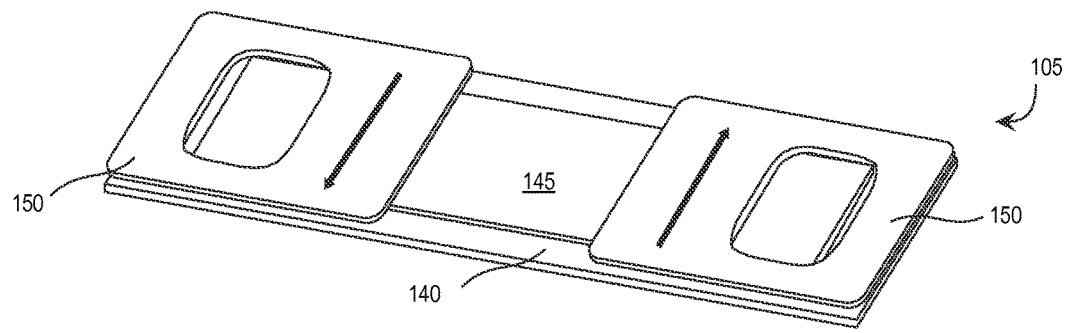

FIG. 5 illustrates another implementation of the primary coil assembly 105 of FIG. 2 in which current in the coils 150 is flowing in the same direction (both clockwise in this example). Current flow, in other examples however, may be counter-clockwise. This configuration may create a three-pole flux distribution.

Figure 6:
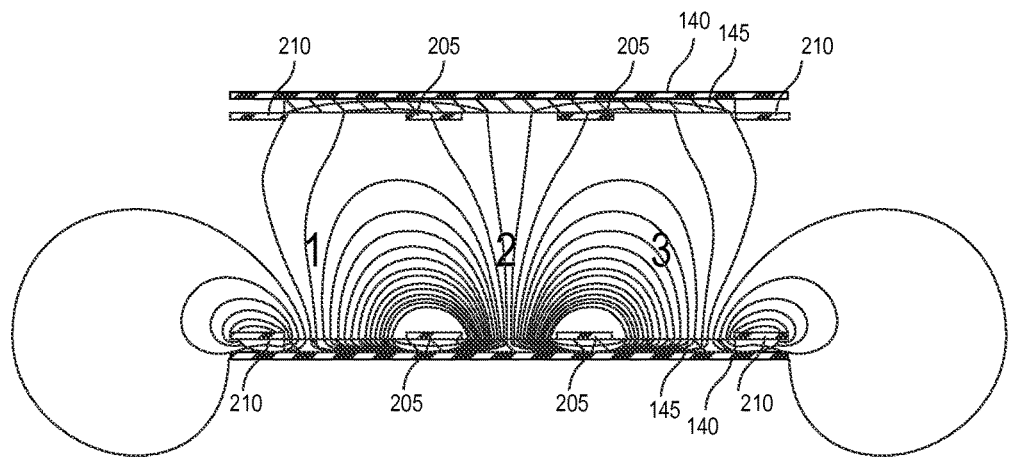

FIG. 6 illustrates the corresponding flux distribution for a three-pole configuration in which the flux is distributed at a central pole and two edge poles between the primary and secondary coil assemblies 105, 110.

Figure 7:
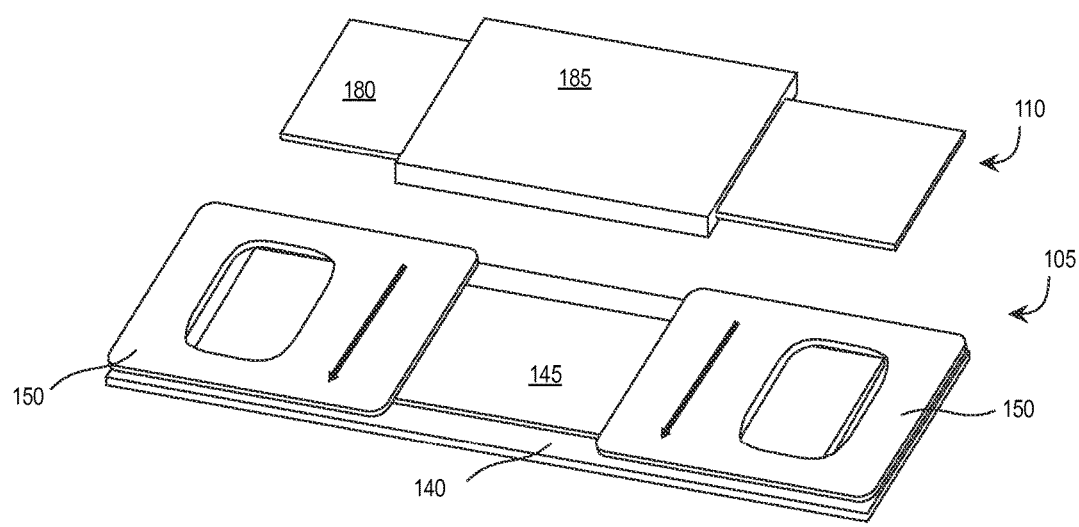
FIGS. 7, 8, 12 and 14 are perspective views of primary and secondary coil assemblies.

FIG. 7 illustrates an exemplary secondary coil assembly 110 over the exemplary primary coil assembly 105 of FIG. 2. The secondary coil assembly 110 may include a secondary ferrite pad 180 with a secondary solenoidal coil 185 wrapped there around. Although not shown, the secondary coil assembly 110 may also include a backing plate.

Figure 8:
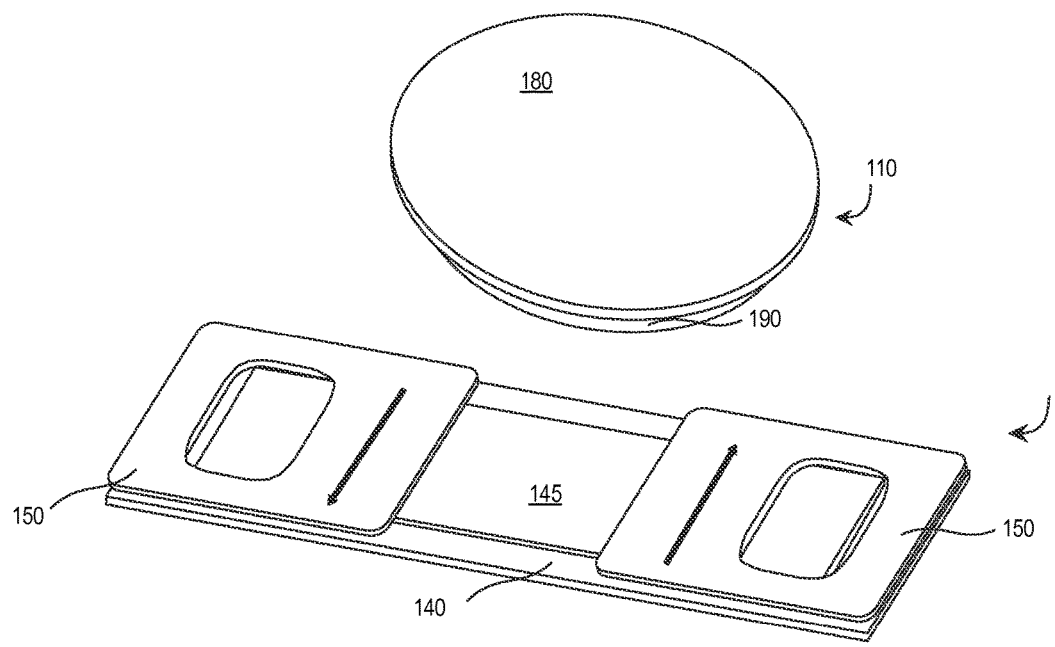

FIG. 8 illustrates another exemplary secondary coil assembly 110 having a circular coil 190 over the exemplary primary coil assembly 105 of FIG. 2. In this example, the secondary coil assembly 110 may include a secondary circular coil 190. The coil 190 may be arranged on a ferrite pad 180. Although not shown, the secondary coil assembly 110 may also include a backing plate.

Figure 9:
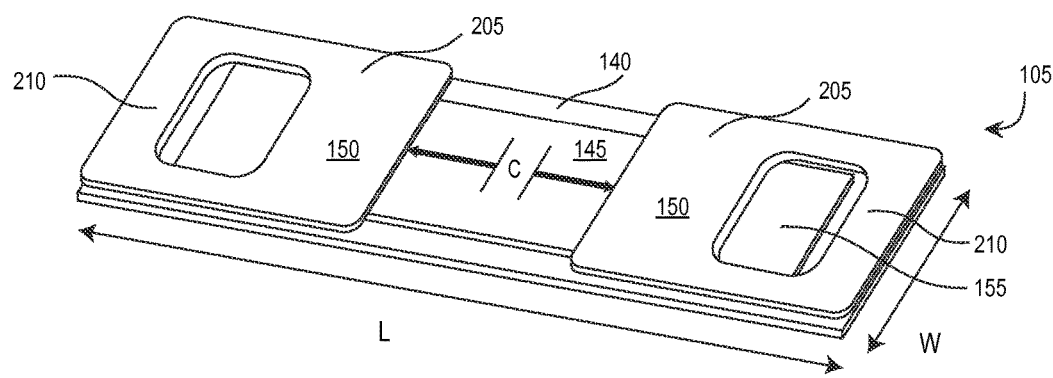
Figure 10:
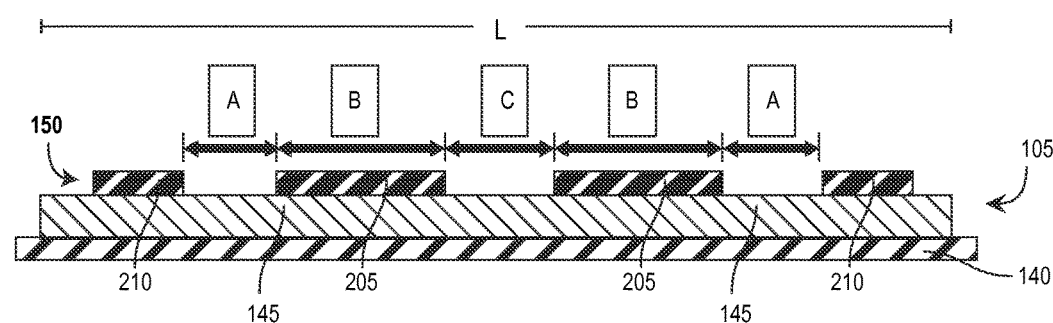
FIG. 10 is a side view, in cross section, of the primary coil assembly of FIG. 9.

FIG. 9 shows the primary coil assembly 105 of FIG. 2 with additional dimensions for the length L and width W. FIG. 10 shows a cross-sectional view of the primary coil assembly 105 including the two circular coils 150, each having an inner portion 205 and an outer portion 210. The coil opening 155 between the inner and outer portions 205, 210 may have an opening width A. The inner portion 205 may have an inner portion width B, and the space between the two parallel coils 150 may be indicated as center space C.

The dimensions of A, B, C, L and W may be relevant to the interoperability of the WPT system 100. For example, the dimensions may be optimized so that the primary coil assembly 105 may operate as a coupler for both two-pole and three-pole systems. Optimum performance in a linear two-pole configuration may require a small value for center space C. Optimum performance in a linear three-pole configuration may require a large value for center space C. Optimization for each configuration may result in a compromise between the ideal values of C. For example, C may be approximately 10% of the length L of the ferrite pad 145. This optimization may permit both the two-pole and three-pole configurations.

Figure 11:
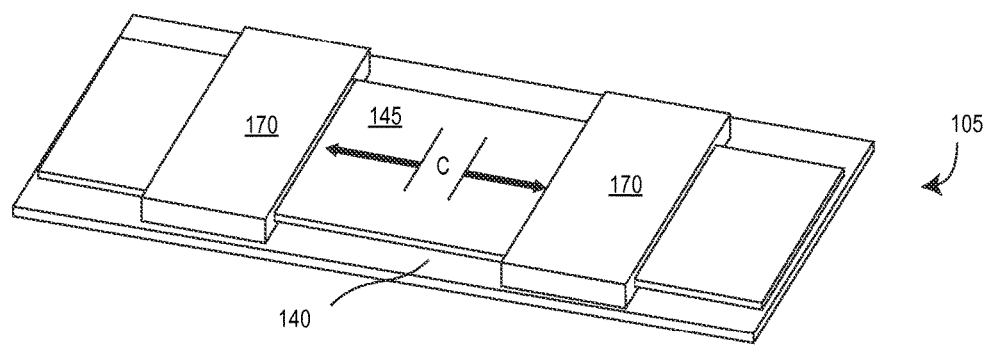

FIG. 11 is another exemplary primary coil assembly 105 having two solenoidal coils 170. The coils 170 may be copper windings, but unlike the windings of FIG. 2, the coils 170 may form a solenoidal structure having a continuous winding wrapped around the ferrite pad 145 instead of a spiral winding arranged on top of the pad 145. The coils 170 may extend around and transverse to the pad 145. The two coils 150, 170, as shown in FIGS. 2 and 3, may be separated by a center space C.

Figure 12:
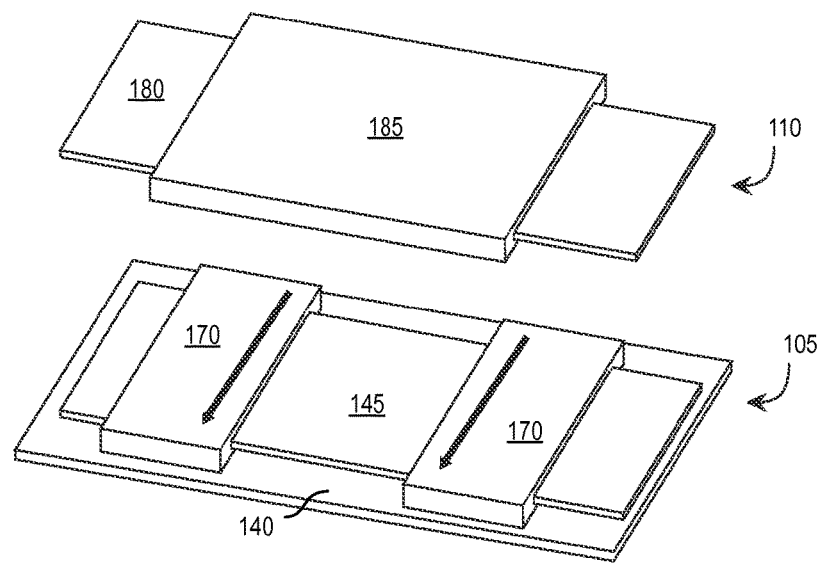
Figure 13:
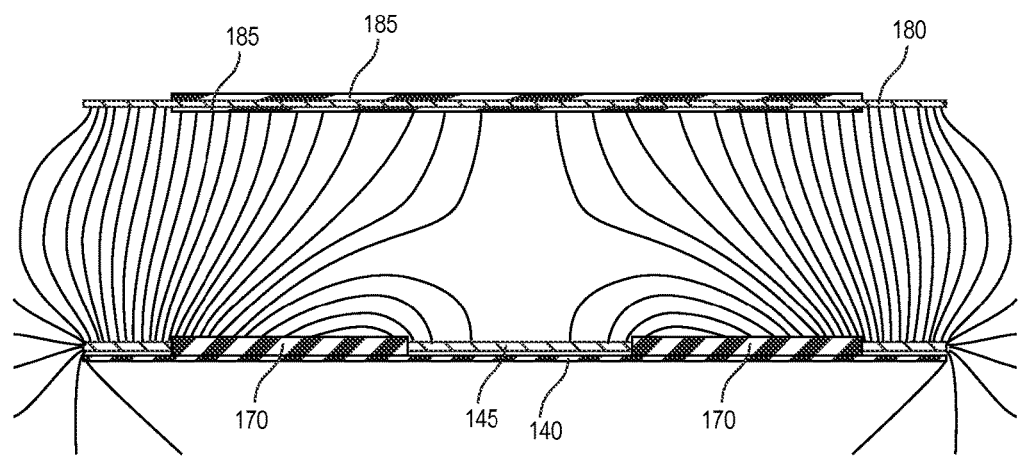
FIGS. 13 and 15 are side views, in cross-section, of primary and secondary coil assemblies for two-pole and three-pole configurations respectively.

FIG. 12 illustrates a primary coil assembly 105 similar to FIG. 11 and a solenoidal secondary coil assembly 110. FIG. 12 shows an exemplary current flow through the coils 170. In this example, current is flowing in the same direction with respect to the center space C. As current is transmitted through the coils 170 at the primary coil assembly 105, energy may be transmitted to the secondary coil assembly 110 via a magnetic field. If the secondary coil assembly 110 includes a two pole configuration, then the current may flow in the same direction with respect to the center space C. That is, both currents may extend parallel to each other, as shown in FIG. 12. An exemplary flux distribution for this configuration is shown in FIG. 13.

Figure 14:
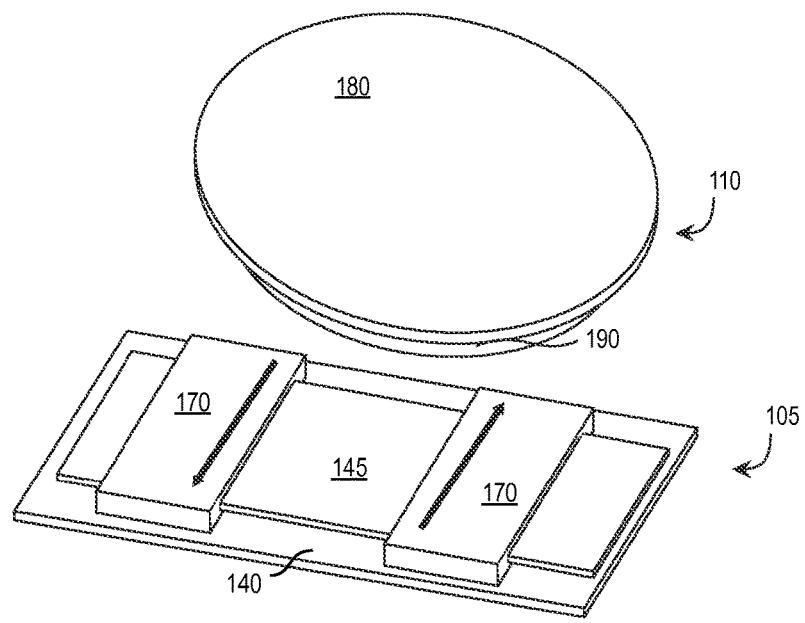
Figure 15:
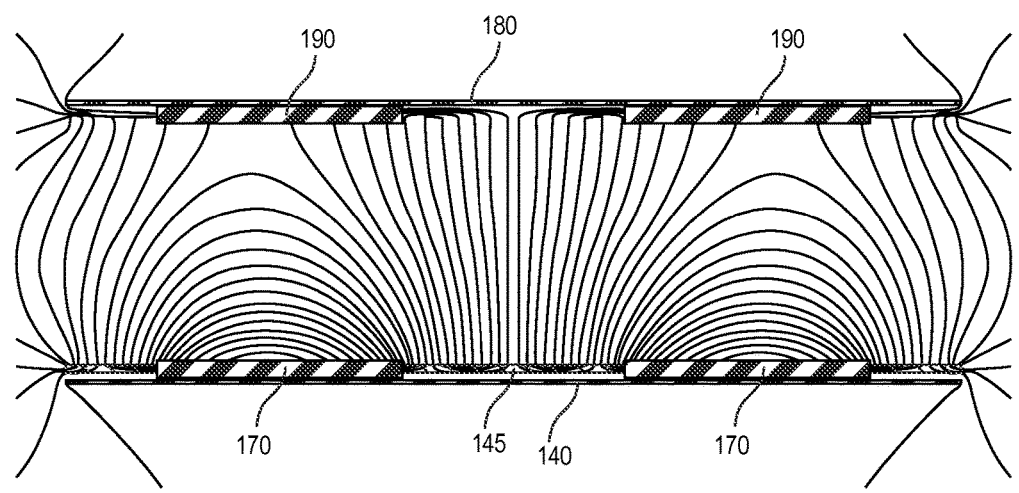

FIG. 14 illustrates a primary coil assembly 105 similar to FIG. 11 and a circular secondary coil assembly 110. In this example, current is flowing in opposite directions in each of the coils 170. This configuration may create a three-pole flux distribution, as shown in FIG. 15.

Figure 16:
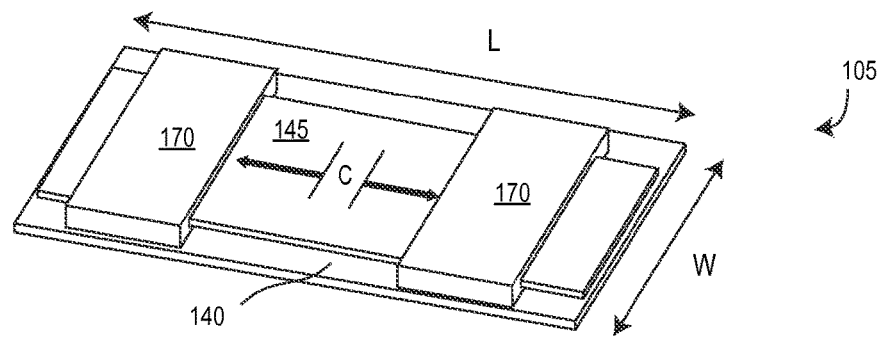
Figure 17:
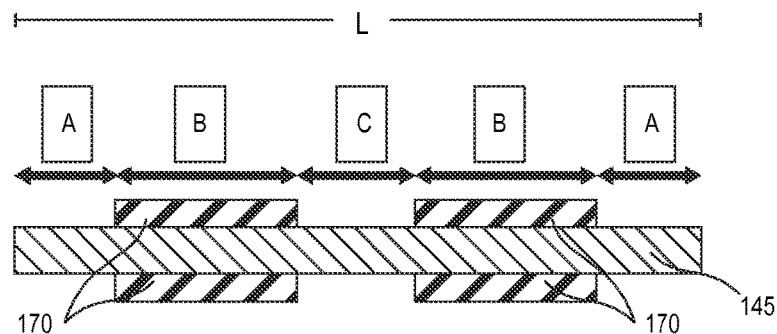
FIG. 17 is a side view, in cross section, of portions of the primary coil assembly of FIGS. 12 and 14.

FIG. 16 shows the primary coil assembly 105 of FIG. 11 with additional dimensions for the length L and width W. FIG. 17 shows a cross sectional view of the primary coil assembly 105 including the two solenoidal coils 170, each having a width B separated by center space C. As explained above, the dimensions of A, B, C, L and W may be relevant to the interoperability of the WPT system 100. Optimum performance in a linear three-pole configuration may require a large value for center space C. Optimization for each configuration may result in a compromise between the ideal values of C. For example, C may be approximately 10% of L. This optimization may permit both the two-pole and three-pole configurations for the solenoidal coils 170 of the primary coil assembly 105.

The primary coil assembly 105 may receive a command from the secondary coil assembly 110. The command may include an indication of the configuration of the secondary coil assembly 110 (e.g., two-pole or three-pole configuration.) The primary coil assembly 105 may respond to the command by instructing current to flow through each of the coils in the appropriate direction. This is described below with respect to the coil combining network 260 of FIG. 19.

By switching the direction of the current flow in one of the primary coils 150, 170 the primary coil assembly 105 may be configured to effectively transmit power to a secondary coil assembly 110 in either of the two-pole or three-pole configurations. Thus, the primary coil assembly 105 is interoperable between two- and three-pole configurations. Likewise, a secondary coil assembly 110 may be configured to effectively operate in a two- or three-pole configuration for coupling to a primary coil assembly 105 having various pole configurations.

Figure 19:
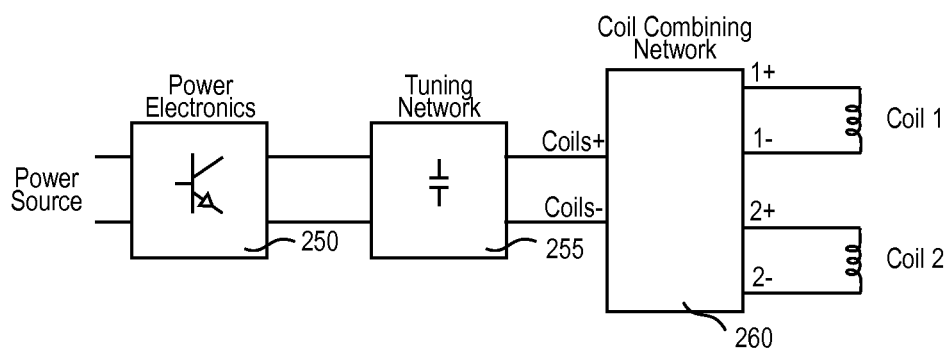
FIGS. 19, 20 and 22 are block diagrams of coil combining networks for a wireless power transfer system.
Figure 20:
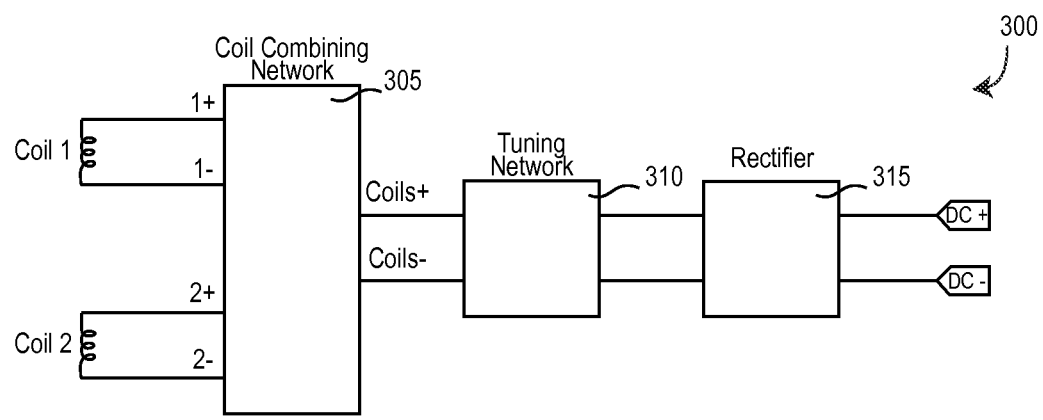

As explained herein, while specific reference was made to the coil assemblies 105 in FIG. 2 and FIG. 3 as the primary coil assemblies, the coil assemblies in FIG. 2 and FIG. 3 may also operate as the secondary coil assembly 110. As described below with respect to FIG. 19, coil combining networks 260 may be used at the primary coil assembly when coil assemblies in FIG. 2 and FIG. 3 are used as the primary coil assembly. Similarly as shown in FIG. 20, coil combining networks 305 may be used at the secondary coil assembly 110 when coil assemblies in FIG. 2 and FIG. 3 are used as the secondary coil assembly 110. While specific reference may be made to the primary assembly 105 and the secondary assembly 110, each assembly may operate as the other. Additionally or alternatively, a DC combining network shown in FIG. 22 may be used at the secondary assembly 110.

Figure 18:
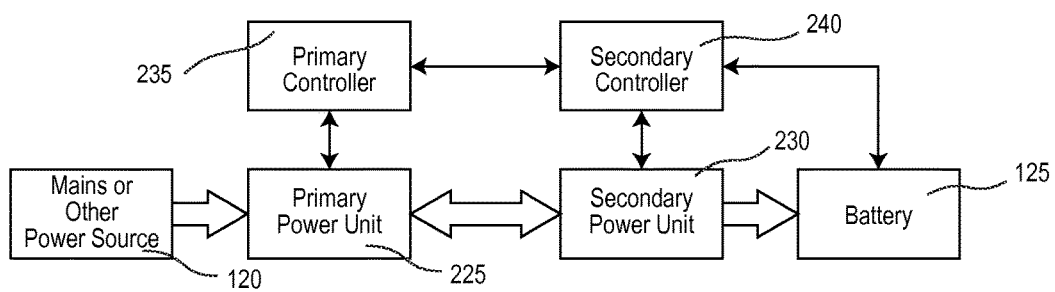
FIG. 18 is a block diagram of a wireless power transfer system.

FIG. 18 illustrates a block diagram of the WPT system 100 having a power source 120, a primary power unit 225, a primary controller unit 235, a secondary power unit 230, a secondary controller unit 240 and a battery 125. In this example, the primary and the secondary controller units 235, 240 may include processors and a memory for carrying out instructions as well as supplying instructions to the primary and secondary coil combining networks, as shown in FIGS. 19 and 20. These instructions may be configured to control the coil current flow and the configuration of the coils in the primary and secondary power units 225, 230 to support two-pole or three-pole flux distributions depending on the misalignment, and the combination of the primary and secondary coupler assemblies 105 and 110.

The primary coil assembly 105 and the secondary coil assembly 110 may communicate with one another. In one example, the communication may be facilitated over radio frequencies, or other wireless communications protocols. The primary coil assembly 105 may transmit a message to the secondary coil assembly 110 indicating the type of coil configuration of the primary coil assembly 105. That is, the primary coil assembly 105 may indicate whether the primary assembly 105 has a two-pole configuration or a three-pole configuration (a solenoidal arrangement or circular arrangement). Depending on the configuration of the primary coil assembly 105, the coil combining network 305 of the secondary may configure the secondary coils 150, 170 so that the secondary coil arrangement matches the primary coil arrangement. In another example, the secondary coil assembly 110 may transmit the message indicating the type of coil configuration to the primary coil assembly 105, etc. As an alternative to communication between the primary and the secondary coil assemblies 105, 110, the secondary or primary units 225, 230 may sweep between two-pole or three-pole modes at low power to find the best suited mode of operation.

FIG. 19 illustrates the details of the coil combining network 260 in the primary power unit 225. The power electronics block 250 connected to the power source 120 may include power electronics circuitry to convert the low frequency AC power to higher frequency AC power. The tuning network 255 may include passive electric components to create a resonance with the primary coils 150, 170. The tuning network 255 may also be a part of the coil combining network 260. The coil combining network 260 may be implemented using active power electronics and/or other passive elements. In this case, the combining network 260 may implement any desired set of 3-port network properties defining the relationships between voltages and currents at the one input port and two output ports.

The details of the coil combining network in the secondary power unit are shown in FIG. 20. The tuning network 310 may include passive electric components to create a resonance with the secondary coils 150,170. The tuning network 310 may also be a part of the coil combining network 305 or may precede the coil combining network 305. The coil combining network 305 may be implemented using active power electronics and/or other passive elements. In this case, the combining network 305 may implement any desired set of 3-port network properties defining the relationships between voltages and currents at the two input ports and one output port. The tuning network 310 in FIG. 20 may be followed with a rectifier 315 to convert the high frequency AC power to DC power to charge the battery.

Figure 21:
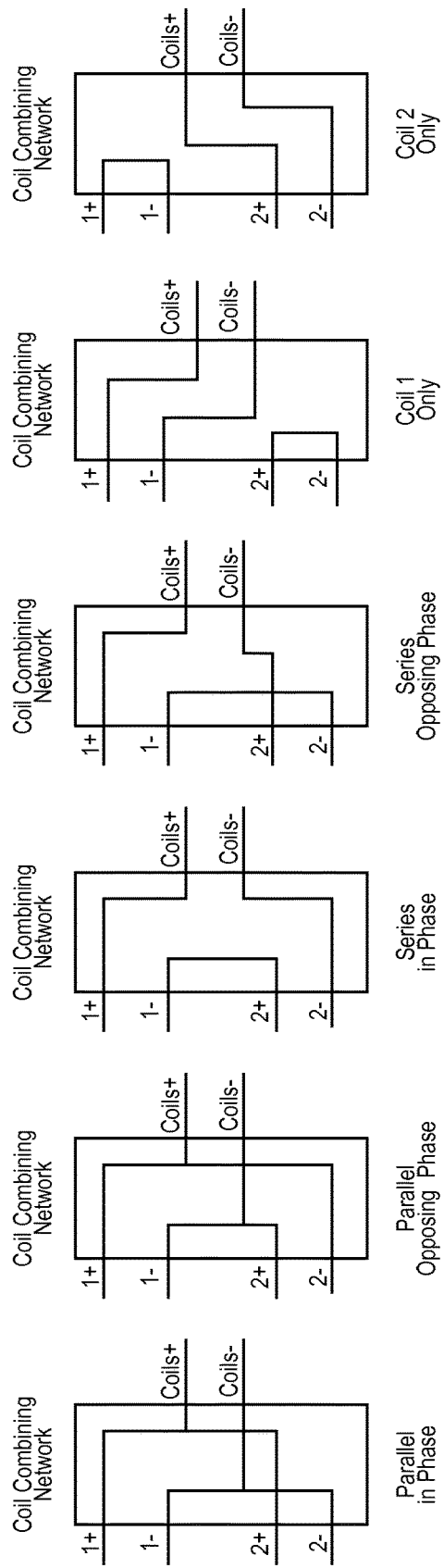
FIGS. 21a through 21f are schematic diagrams of coil arrangements for the system of FIG. 18.
Figure 22:
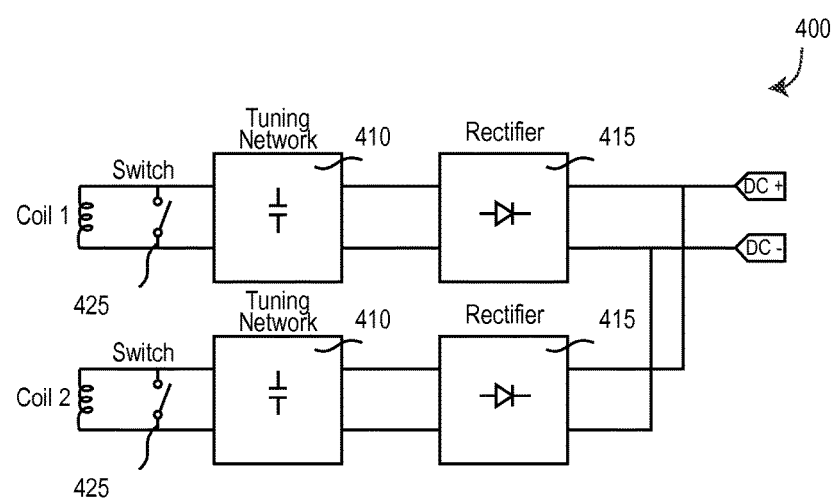

FIGS. 21 and 22 illustrate detailed implementations of the passive coil combining networks. FIGS. 21a through 21f show various coil arrangements for combining the coils in the AC circuitry. The coils may be configured in various arrangements including parallel in phase, parallel opposing phase, series in phase, and series opposite phase (see FIGS. 21a through 21d, respectively). Implementing coils in series or parallel configuration may depend on the compensation and control method selected for the operation of the power electronics block. One configuration (e.g. series or parallel) may be selected over another configuration depending on the power electronics and tuning methods for the WPT system 100. However, in-phase and out-of-phase configurations may be selected adaptively during operation at the start of the charging event to excite the two-pole or three-pole flux patterns. In an event in which a large misalignment is recognized between the primary and secondary assemblies 105, 110, one coil may be shorted. Examples of these arrangements are shown in FIGS. 21e through 21f. AC combining network may be used both for primary or secondary power units 225, 235.

FIG. 22 illustrates another exemplary coil combining network system 400 for combining the coils in the DC circuitry for the WPT system 100. In this example, the system 400 may include a rectifier 415 and tuning network 410 for each coil. The system 400 may also include a switch 425 at each coil. The switch 425 may be used to short the respective coils in the event that a large misalignment is recognized. The optional switches may be before or after the tuning network 410 and/or incorporated with it. In this example, the currents on the coils are rectified separately and combined after rectification. Since this method requires rectification, this configuration may be applicable to the secondary power units.

Computing devices described herein generally include computer-executable instructions in which the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A power transfer system comprising:
    a ferrite pad;
    a pair of spaced apart inductive coils positioned exclusively on a same single side of the ferrite pad; and
    a controller configured to, in response to a message indicating a pole configuration of a corresponding inductive coil assembly, arrange a switching network to control a direction of current flow through each of the coils to selectively operate the coils in a two-pole mode or a three-pole mode.

2. The system of claim 1, wherein the directions of current flow through the coils are same in the three-pole mode.

3. The system of claim 1, wherein the directions of current flow through the coils are opposite in the two-pole mode.

4. The system of claim 1, wherein the coils are primary coils.

5. The system of claim 1, wherein the coils are secondary coils.

6. A wireless power transfer system comprising:
    an inductive coil assembly including a ferrite pad and no more than two spaced apart inductive coils on the ferrite pad; and
    a switching network configured to control a direction of current flow through each of the coils such that the coils generate a magnetic flux distribution having three poles, and in response to an indication of coil misalignment, to short one of the coils, wherein the directions of the current flow through the coils are opposite.

7. The system of claim 6, wherein the coils are wrapped around the pad.

8. The system of claim 6, wherein the coils are primary coils.

9. A wireless power transfer system comprising:
    an inductive coil assembly including a ferrite pad and no more than two spaced apart inductive coils on the ferrite pad, wherein the coils are wrapped around the pad; and
    a switching network configured to control a direction of current flow through each of the coils such that the coils generate a magnetic flux distribution having three poles, and in response to an indication of coil misalignment, to short one of the coils.

10. The system of claim 9, wherein the directions of the current flow through the coils are opposite.

11. The system of claim 9, wherein the coils are primary coils.

* * * * *